(12) United States Patent
Holzheu

(10) Patent No.: US 7,752,915 B2
(45) Date of Patent: Jul. 13, 2010

(54) PRESSURE SENSOR

(75) Inventor: Herbert Holzheu, Marktoberdorf (DE)

(73) Assignee: KMW Kaufbeurer Mikrosysteme Wiedemann GmbH, Kaufbeuren (DE)

( * ) Notice: Subject to any disclaimer, the term of this patent is extended or adjusted under 35 U.S.C. 154(b) by 4 days.

(21) Appl. No.: 12/219,207

(22) Filed: Jul. 17, 2008

(65) Prior Publication Data

US 2009/0025482 A1    Jan. 29, 2009

(30) Foreign Application Priority Data

Jul. 27, 2007    (DE) ........................ 10 2007 035 660

(51) Int. Cl.
*G01L 7/00* (2006.01)
(52) U.S. Cl. ........................................................ 73/756
(58) Field of Classification Search ............ 73/756, 73/114.39
See application file for complete search history.

(56) References Cited

U.S. PATENT DOCUMENTS

| | | | |
|---|---|---|---|
| 3,295,374 A * | 1/1967 | Sawada et al. ............... 73/706 |
| 4,399,706 A | 8/1983 | List et al. | |
| 5,939,636 A | 8/1999 | Glaser | |
| 6,945,093 B2 * | 9/2005 | Amano et al. .............. 73/49.7 |
| 7,140,260 B2 * | 11/2006 | Okuda et al. ................. 73/826 |
| 2004/0237629 A1 | 12/2004 | Lenzing et al. | |
| 2007/0199372 A1 * | 8/2007 | Annoura .................... 73/118.1 |

FOREIGN PATENT DOCUMENTS

| | | |
|---|---|---|
| DE | 3026617 | 2/1981 |
| DE | 297 16 060 | 12/1997 |
| DE | 197 06 837 | 8/1998 |
| DE | 103 12 491 | 2/2005 |
| GB | 2 217 846 | 11/1989 |

OTHER PUBLICATIONS

German Search Report dated Feb. 26, 2008.

\* cited by examiner

*Primary Examiner*—Andre J Allen
(74) *Attorney, Agent, or Firm*—Jacobson Holman PLLC

(57) ABSTRACT

A pressure measuring sensor includes a sensor carrier and a membrane carrier carrying a membrane. The sensor carrier is equipped with a connection channel in order to connect the membrane space arranged in front of the membrane with the pressure measuring space. A deviation is provided through which the gas pressure wave running from the pressure measuring space through the connection channel in the membrane space experiences a cooling.

13 Claims, 1 Drawing Sheet

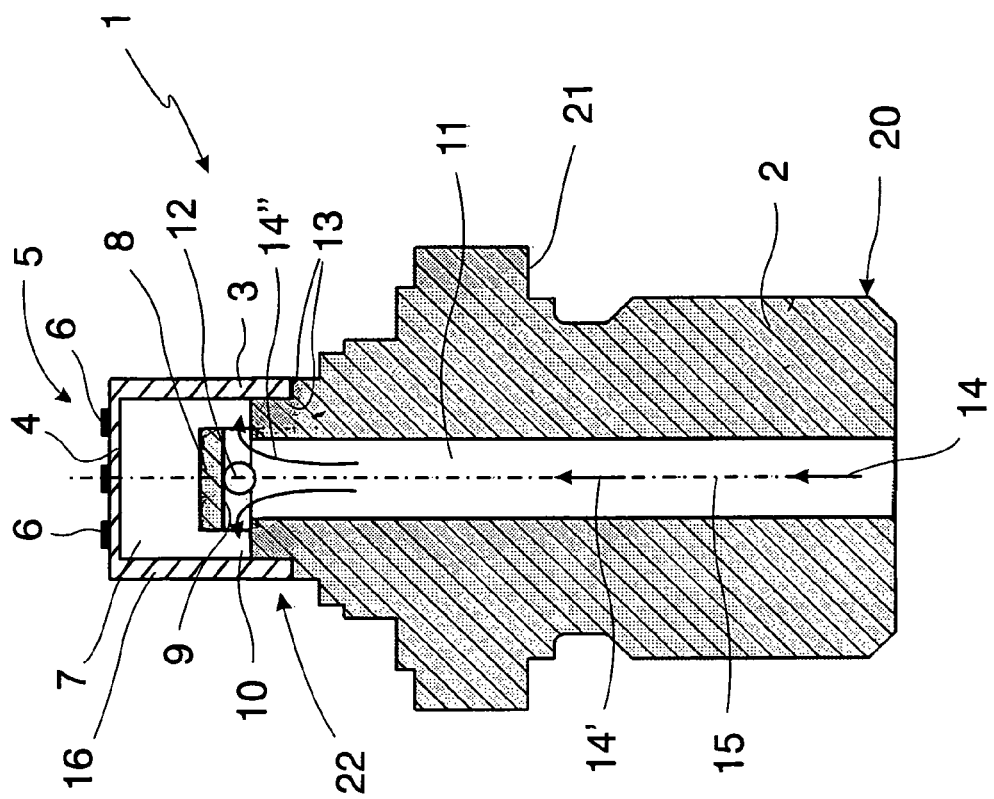
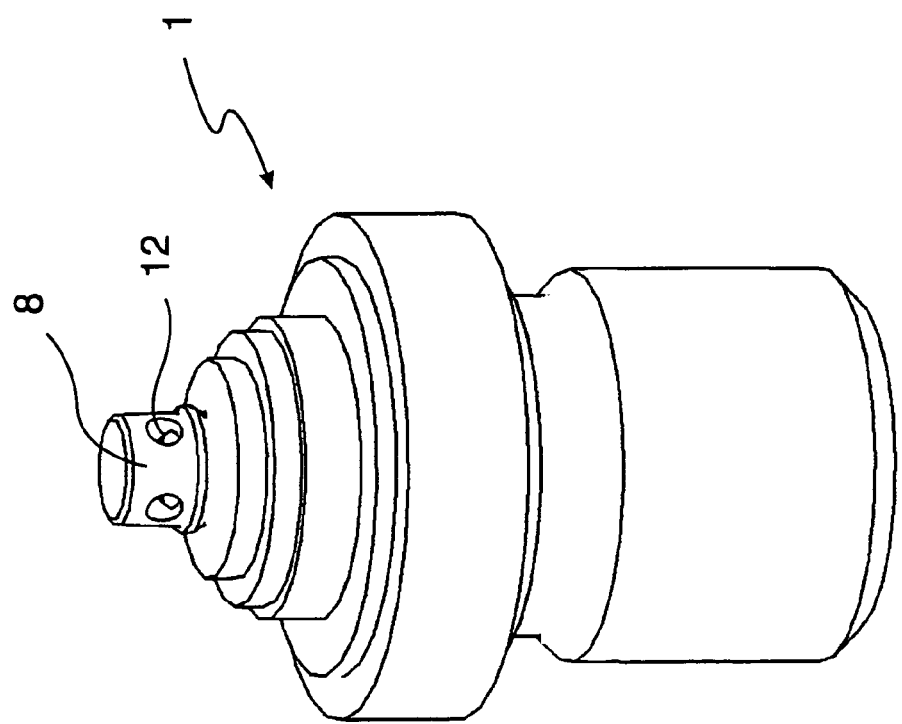
Fig. 1
Fig. 2

PRESSURE SENSOR

FIELD OF THE INVENTION

The invention refers to a pressure sensor comprising a sensor carrier at which a membrane carrier receiving a membrane is arranged, and the sensor carrier has a connection channel for connecting the membrane space arranged in front of the membrane with the pressure measuring space.

BACKGROUND OF THE INVENTION

The pressure sensors according to the invention are used, for example, for pressure measuring in internal combustion engines. The work room of the internal combustion engine would be in this case the pressure measuring space. The invention, however, is in no way restricted to this particular case of application.

If the pressure of the internal combustion process is known it is possible to optimise the combustion process accordingly, and, in particular, to use the used energy sources more efficiently.

The pressure wave occurring during the combustion process is accompanied by a temperature wave because of the combustion process going off like an explosion. Here this temperature shock wave together with the pressure wave hits the sensor, that means in particular the membrane of the sensor. The membrane has a suitable measuring device for measuring its pressure dependent deformation, and to define the accordingly connected pressure.

Now the membrane does not only experience mechanic stress because of the pressure wave, but it is also stressed mechanically because of the temperature shock wave. Because of the temperature-dependent length extension the membrane is deformed also mechanically only because of the temperature level and leads to a measurement error as the effect is not pressure-dependent.

Usually the sensor is built in near the pressure measuring space, for example in the motor unit which is well cooled by cooling water. Therefore also the sensor is generally thermally well connected with the motor unit and therefore also cooled well.

The sensors kept at normal operation temperatures, for example 80° C., experiences then in periodic cycles, according to the combustion process, a thermal peak stress of several hundred degrees at the membrane. This leads to a large temperature gradient in the membrane carrier, and, in particular, in the membrane with the risk that the different wire strain gauges forming the measuring device and connected according to a Wheatstone bridge circuit to each other have a different temperature level, and therefore also can contribute to considerable measuring errors.

SUMMARY OF THE INVENTION

It is an object of the present invention to improve pressure sensors as described in the beginning in order to increase their precision.

This problem is solved by a pressure sensor as described in the beginning where it is suggested that at least one deviation is provided through which the gas pressure wave running from the pressure measuring space through the connection channel in the membrane space experiences a cooling.

It is known in the state of the art to provide a connection as straight as possible between the membrane and the pressure measuring space through the connection channel designed, for example, as boring. However, as at the same time the membrane is designed because of its measuring task as fragile component equipped with small heat transmissions, the elimination of heat is not optimal because of the impact of the temperature shock.

The effect of the deviation provided according to the invention occurs in two respects.

First of all, the deviation has the effect that the entering gas pressure wave does not flow directly towards the membrane but is guided at the deviation as a separate structural component, and is, of course, cooled there. Furthermore, the deviation has the effect that the flow of the gas pressure wave does not directly hit the membrane but, for the time being, brushes past the membrane carrier, and also experiences a suitable cooling there. Here cleverly the arrangement is chosen in such a way that the gas pressure wave running high in the connection channel reaches first of all the membrane carrier, and only then the membrane, and thus the result is a heating of the membrane carrier and the membrane as steady as possible because of the inevitable temperature shock which accompanies the gas pressure wave.

The result is here eventually a more homogenous heating of the membrane carrier and the membrane or a heating with a smaller temperature gradient which leads to a corresponding avoidance of measuring errors because of the different temperatures at the wire strain gauge or the measuring device at the membrane.

The deviation itself thus leads because of its concrete embodiment to a cooling of the gas pressure wave running to the membrane space, or the deviation takes care that the gas pressure wave is guided first of all to other areas, for example of the membrane carrier, and also gives off temperature there, or heats the membrane carrier in such a way that a small temperature gradient settles there.

In a preferred modification of the invention it is provided that in the direction of the connection channel the membrane is covered by the deviation. There may be a spatial connection in order to be able to carry out the measuring of the pressure but the membrane experiences by the deviation also a mechanic protection against, for example, particles entering the connection channel.

Furthermore the invention provides in a preferred modification that the deviation is located at the end of the connection channel opposite the pressure measuring space. Such a design has the advantage that, when the distance from the pressure measuring space increases, the environmental temperature decreases accordingly, which is basically advantageous for the measuring process. The end of the connection channel facing the pressure measuring space is located in an immediate neighbourhood of the hot explosion gases, and an arrangement of the deviation in this area does not cool as efficiently because also the environment at the beginning of this channel is much hotter than at the end of the connection channel opposite the pressure measuring space. The result of that is a basically cooler deviation formed concretely as well as the flow deviation of the gas pressure wave effected by the deviation of the gas pressure wave to basically cooler surfaces of the membrane carrier or sensor carrier.

In another preferred modification of the invention it is provided that the deviation is part of the sensor carrier. The sensor carrier is here, for example, designed as a built-in component, and has a suitable exterior thread in order to screw it in a corresponding thread of the motor unit. The sensor carrier itself carries the membrane carrier which carries the membrane. The deviation is here, for example, designed as a one-piece part of the sensor carrier, or the sensor carrier consists of several elements, the deviation being an element of the sensor carrier.

Because of the extensive connection of the sensor carrier with the well cooled motor unit also the sensor carrier and thus also the deviation experiences a good cooling.

Alternatively it is also provided that the deviation is part of the membrane carrier. Such a modification is also part of the invention. For example, at the membrane carrier an area is provided which is designed as heat exchange surfaces which serve as deviation, and thus cool the hot gas pressure wave or lower the temperature gradient at the membrane or in the membrane carrier accordingly. It is, for example, possible to provide a relatively complex membrane carrier having extensive cooling surfaces, and, if necessary, having an additional thermal coupling with the sensor carrier in order to contribute to a suitable cooling in the area of the membrane for effecting a temperature coefficient as low as possible.

In a preferred embodiment of the invention it is provided that the deviation is designed as an element closing the connection channel partly with at least one opening arranged at the side, in particular with an angle to the connection channel. Such a construction can be realized easily as the element is designed, for example, as a disc or profile section, and the connection channel, which is arranged, for example, as boring in the sensor carrier, is put on at the end opposite the pressure measuring space. Alternatively it is, of course, also possible to form a suitable base by cutting working out of the sensor carrier which is the end area of a pocket drilling, the pocket drilling forming the connection channel. Through the arrangement of an opening or a lateral boring an access is created to this pocket drilling or the connection channel, and the deviation is realized. Cleverly between the membrane space, that means the space located directly at the membrane, and the connection channel another connection space is provided which presents in particular the possibility that the gas pressure wave running to the membrane space cools off. Cleverly the connection space is designed optimized for an optimal temperature transmission, that means, for example, large heat exchange surfaces and relatively high flow rates of the gas pressure wave are taken into consideration. The result of that is, for example, a relatively long extending, sleeve-like design of the connection space with a small width.

Cleverly here the connection space is limited, on the one hand, by the membrane carrier, and, on the other hand, by parts of the sensor carrier, in particular by the element. The sensor carrier is well coupled thermally with the cooling of the entire internal combustion engine. The membrane carrier is heated homogenously by the gas pressure wave flowing in, and leads to a relatively small temperature coefficient at the membrane, also because the temperature level existing at the heat transmission is lowered.

In a preferred modification of the invention it is provided that the width of the connection space is less than the diameter or the width of the connection channel.

The result of such a design is a higher flow rate of the gas pressure wave in the connection space than in the connection channel, and thus an improved heat transmission to the areas restricting the connection space, that means preferably the element or the sensor carrier or the membrane carrier.

Cleverly it is provided that the membrane carrier, in particular the area of the membrane carrier opposite the membrane, serves for cooling the gas pressure wave. Thus cleverly heat is withdrawn from the gas pressure wave, and a cooled-down gas pressure wave hits the membrane for measuring the pressure. At the same time, the membrane carrier and thus also the areas of the membrane carrier actually carrying the membrane are heated in order to reduce the temperature gradient in the membrane accordingly.

As the element or the deviation is coupled well thermally to the sensor carrier also the element or the deviation is provided and serves for cooling.

In a preferred modification of the invention it is provided that the length of the connection area between the membrane carrier and the sensor carrier is larger than the width of the connection space. By means of such a geometric design a comparatively good thermal coupling of the membrane carrier to the sensor carrier is effected. The result is a good cooling of the membrane carrier via the sensor carrier. Here the length of the connection area is not only defined by its width. The length can actually also be understood, for example, angled, and this is when, for example, the membrane carrier is set on a flange, and front face as well as the side faces are in thermal contact with the sensor carrier. This leads to an accordingly larger coupling surface, and thus to an improved heat transmission between the membrane carrier and the sensor carrier.

In another preferred embodiment of the invention it is provided that the membrane space is limited at least on one side by the membrane, and the height of the membrane space is larger than the distance in the connection space between membrane carrier and sensor carrier.

The height of the membrane space is defined here by the distance of the membrane to the element or to another element of the sensor carrier or the membrane carrier. Preferably here the membrane space is designed cylinder- or disc-like. The invention, however, is not restricted here in any way. By means of the now here chosen dimension the gas pressure wave flowing in is decelerated. By means of the heat transmission deteriorates, as it is depending on the flow rate. Just in the area of the membrane, of course, impressing of additional heat volumes with higher temperature in the membrane is not desired, so that this is an advantageous arrangement.

Cleverly the membrane has, preferably on the side opposite the membrane space, a measuring device for the pressure dependent membrane deformation. This is designed, for example, as wire strain gauge, and is realized according to a Wheatstone bridge circuit. The pressure dependent membrane deformation changes the electric resistance in the wire strain gauge which can be measured and evaluated by the measuring arrangement.

Cleverly here a pot-like design of the membrane carrier is suggested, the membrane being formed by the bottom of the pot. Such a design can be produced easily in a mechanical respect and is realized preferably in, for example, metal, steel, iron or other alloys. It is convenient here that the arrangement is designed in one piece, that means the membrane is formed, for example, by cutting work out of the pot, or is set in and thus connected by suitable welding methods or other connecting methods as a bottom of the pot in the annular surface area of the membrane carrier.

In the pot-like design of the membrane carrier the surface areas also form the connection area for joining the membrane carrier to the sensor carrier. Conveniently therefore also this surface area serves for cooling the gas pressure wave by the deviation preferably directing it to that.

BRIEF DESCRIPTION OF THE DRAWINGS

In the drawing the invention is shown schematically.

In the drawings:

FIG. 1 in a three-dimensional view the sensor carrier of the pressure sensor according to the invention, and FIG. 2 a section through the pressure sensor according to the invention.

DETAILED DESCRIPTION OF THE PREFERRED EMBODIMENTS

In FIGS. 1 and 2 an example of a pressure sensor 1 is shown in different modifications. It has to be taken into consideration that FIG. 2 is not a section view true to scale of the pressure sensor 1 shown in a three-dimensional view in FIG. 1. Furthermore, it has to be taken into consideration in FIG. 1 that here the element 8 forming the deviation 9 can be seen with the openings 12 which is covered in the presentation according to FIG. 2 by the membrane carrier 3. It has to be taken into consideration here that the pressure sensor 1 has another housing covering the membrane carrier 3, which is not shown here for presentation and clearness reasons.

The pressure sensor 1 is constructed essentially by two elements, the sensor carrier 2 and the membrane carrier 3. The sensor carrier 2 is set in with its bottom end 20 in an opening of the pressure measuring space, for example screwed in, until, for example, the flange 21 sits close to the limiting wall of the pressure measuring space.

The bottom region 20 therefore faces the pressure measuring space, in the pressure measuring space, for example in internal combustion engines, combustion processes are carried out in fast sequence which lead to corresponding gas pressure waves and temperature shock waves.

The sensor carrier 2 has a boring arranged in this example coaxial and serving as connection channel 11. The boring penetrates the sensor carrier 2 almost completely, and is closed by an element 8 at the end 22 opposite the bottom end, which is also hot, of the pressure sensor 1.

The path of the pressure wave is indicated by arrows and indicated by the reference numbers 14, 14' and 14", the sequence of the wave being indicated by the increasing number of quotation marks of the reference number 14. The pressure wave enters the connection channel 11 coming from the pressure measuring room, and then multiplies upwards.

In order to avoid the hot pressure wave hitting directly the membrane 4 a deviation 9 is provided according to the invention.

At the upper end 22 of the sensor carrier 2 a pot-like membrane carrier 3 is provided the bottom of which forms the membrane 4. The membrane carrier 3 with the membrane 4 here covers the element 8. Between the element 8 and the membrane 4 the membrane space 7 occurs. The membrane space 7 is in connection with the connection channel 11 via the connection space 10. As on the upper end 22 of the sensor carrier 2 the element 8 is arranged, and actually covers the interior end of the connection channel 11 opposite the pressure measuring space, the element 8 has a number of openings 12 forming a connection between the connection space 10 and the connection channel 11. For a flowing-through as homogenous and rotationally symmetrically as possible openings 12 are provided equidistantly at the circumference of the disc-like element 8. It has to be taken into consideration that the normal line of the plane of the openings 12 is angled, in particular rectangular to the longitudinal axis 15 of the connection channel 11.

By means of this angled arrangement, here for example rectangular arrangement, of the openings 12 with reference to the connection channel 11 the element 8 forms a deviation 9 for the pressure wave 14 running upwards in the connection channel 11, which is in particular indicated in the area of the element 8 by the deviated arrows 14".

Thus it becomes clear that the hot gas pressure wave 14", on the one hand, strokes along the side of the element 8 facing the connection channel 11, and, because of the good thermal coupling of the element 8 to the sensor carrier 2 experiences a cooling here. After that the already slightly cooled-down pressure wave hits the end opposite the membrane 4 of the membrane carrier 3, which is also connected well thermally with the sensor carrier 2 via the connection area 13.

The sensor carrier 2 is, as already mentioned, set in the cooled motor unit or limiting wall of the pressure measuring space, and is kept at a relatively low temperature level.

The gas pressure wave 14 now strokes along the surface area 16 of the membrane carrier 3, and hits the membrane 4 only after a certain cooling down. The temperature level already reduced in this area and the already heated surface area 16 of the membrane carrier 3 leads to the result that the membrane 4 has a small temperature gradient.

Cleverly several wire strain gauges 6, for example in the frame of a Wheatstone bridge circuit, are arranged as measuring device 5 on the side of the membrane 4 opposite membrane space 7. The surprising effect of the invention is that the temperature distribution on the membrane is relatively homogenous as the gradient of the temperature distribution is lowered clearly because of the arrangement according to the invention. The result from that is a considerably small measuring inaccuracy.

The deviation effects, on the one hand, a cooling opportunity for the gas pressure wave 14" coming in, as well as a deviating or deflecting of the gas pressure wave and other parts of the sensor carrier 2 or the membrane carrier 3.

The membrane carrier 3 is screwed or put on a base of the sensor carrier 2 and connected pressure-sealed, for example welded. A graded connection area 13 forms between the membrane carrier 3 and the sensor carrier 2 in order to realize a good thermal coupling, for example for cooling purposes.

The claims filed with the application now and to be filed later on are attempted formulations without prejudice for obtaining a broader protection.

If here, on closer examination, in particular also of the relevant prior art, it turns out that one or the other feature may be convenient for the object of the invention, however, not decisively important, of course already now a formulation is striven for which does not contain anymore such a feature, in particular in the main claim.

Furthermore it has to be taken into consideration that the embodiments and modifications of the invention described in the different examples and shown in the figures can be combined with each other in any way. Here single or several characteristics can be exchanged in any way. These combinations of characteristics are also disclosed.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics from claims which comprise a variety of characteristics may be used at any time to distinguish from the state of the art in the first claim, and this is even if such characteristics have been mentioned in connection with other characteristics, or achieve particularly convenient results in connection with other characteristics, respectively.

The invention claimed is:
1. Pressure sensor comprising
   a sensor carrier,
   a membrane carrier mounted on said sensor carrier, said membrane carrier including a membrane, the sensor carrier having a connection channel for connecting a membrane space arranged in front of the membrane with a pressure measuring space, and at least one deviation provided through which a gas pressure wave runs from the pressure measuring space through the connection channel to the membrane space, the gas pressure wave being cooled in said membrane space, the deviation including an element partially blocking the connection channel, and the element including at least one lateral opening arranged at an angle to the connection channel.

2. Pressure sensor according to claim 1, wherein the membrane is covered by the deviation in a direction of the connection channel.

3. Pressure sensor according to claim 1, wherein the deviation is located at an end of the connection channel opposite the pressure measuring space.

4. Pressure sensor according to claim 1, wherein the deviation is part of the sensor carrier.

5. Pressure sensor according to claim 1, wherein the deviation is part of the membrane carrier.

6. Pressure sensor according to claim 1, wherein a connection space is located between the membrane space and the connection channel.

7. Pressure sensor according to claim 1, wherein a connection space is limited on one side by the membrane carrier, and on the other side by the element.

8. Pressure sensor according to claim 1, further comprising a connection space and a width of the connection space is less than a diameter or a width of the connection channel.

9. Pressure sensor according to claim 1, wherein areas of the membrane carrier located opposite the membrane serve for cooling the gas pressure wave.

10. Pressure sensor according to claim 1, further comprising a connection area and a length of the connection area located between the membrane carrier and the sensor carrier is larger than a width of the connection space.

11. Pressure sensor according to claim 1, wherein the membrane space is limited at least on one side by the membrane, and a height of the membrane space is larger than a distance in the connection space between the membrane carrier and the sensor carrier.

12. Pressure sensor according to claim 1, wherein the membrane, on a side opposite the membrane space, has a measuring device for pressure dependent membrane deformation.

13. Pressure sensor according to claim 1, wherein the membrane carrier has a pot shape, and the membrane is formed by a bottom of the pot.

* * * * *